United States Patent Office 3,153,598
Patented Oct. 20, 1964

3,153,598
PAPER SIZE FROM PINE OLEORESIN
Hugh B. Summers, Jr., and Glen W. Hedrick, Lake City, Fla., assignors to the United States of America as represented by the Secretary of Agriculture
No Drawing. Filed July 9, 1962, Ser. No. 208,651
3 Claims. (Cl. 106—238)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of sizes from pine oleoresin and more specifically this invention relates to paste sizes and dry sizes for paper prepared from neutralized and partially neutralized pine oleoresin.

Rosin has been accepted as an ingredient for paper size since about 1900. Originally, pine oleoresin was the only source of rosin. More recently, however, the cheaper wood and tall oil derived rosins have, to a large extent, supplanted gum rosin as a raw material for both conventional and fortified paper sizes. In order to make gum naval stores more competitive with wood and tall oil derived paper sizes, we have developed the sizes of the instant invention which obviate the intermediate isolation of rosin and permit the direct processing of pine oleoresin to yield either conventional or fortified paste sizes or dry sizes for paper.

In general, for the sizes of this invention, the pine oleoresin is cleaned for use as in the Olustee rosin process (U.S. #2,254,758), which involves diluting the crude oleoresin with turpentine, filtering, and washing with water to remove the water soluble impurities.

The resin acids at this point are then partially neutralized and the volatiles removed by steam sparging. Since maleic anhydride reacts readily at room temperature with the levoprimaric acid in the oleoresin, treatment with maleic acid prior to neutralization is utilized to produce fortified paper sizes with no other changes in the process.

U.S. #2,846,430 demonstrates the desirability, from the point of view of preventing resin acid isomerization, of at least partially neutralizing the resin acids in pine oleoresin prior to subsequent processing that involves heating.

The preparation of the sizes that are the subject of this invention is unique in that the sizes are made directly from partially neutralized pine oleoresin, thus obviating the necessity for isolating and handling rosin which operations characterize conventional preparation of sizes.

For the preparation of the sizes that are the subject of this invention, we can neutralize the resin acids to the extent of from 60 to 90 percent. We prefer however to neutralize at least 75 percent of the resin acids present in the pine oleoresin before heating the neutralized material to reduce the volatiles.

For our paste sizes, we prefer to reduce the volatiles to the extent that the finished size will be approximately 75 percent solids by weight.

The paste sizes which are the subject of this invention have been produced in pilot plant batches and have been found to produce satisfactory dry sizes in a heated ball mill that is flushed continuously with an inert gas (carbon dioxide) to remove volatiles. Both acid sizes and completely neutralized dry sizes were produced in this manner. The dry products are almost colorless, hygroscopic powders which are readily dispersed in hot water (120° F.).

In development of the process described in this application it was found that conditions for distillation were critical. If the batch was overcharged, foaming was excessive. For example, 254 lbs. of an aliquot of neutralized oleoresin like that used in Example 2 below was charged to the kettle. When most of the turpentine had distilled the rate of distillation had to be drastically reduced to prevent foaming. However, when 44 lbs. of the still residue was drawn off foaming could not be induced by full steam and rapid agitation. This condition was also caused by the addition of too much water. A paste from which most of the turpentine was removed containing 36 percent water foamed excessively. When the water content was reduced to 28 percent foaming was slight. When the composition contained 23.6 percent water foaming could not be induced by any means—vigorous agitation and/or steam sparging. Sizes were prepared with varying degrees of free resin acid content by adjusting the sodium hydroxide used for neutralization. The extent of resin acid neutralization ranged from 62 to 90%.

A rather long stripping operation was employed to remove as many of the volatiles as possible. By use of ASTM tests, the volatile oils were lower than found in gum rosin.

EXAMPLE 1

*Paste sizes from crude pine oleoresin.*—Freshly collected crude pine oleoresin, 390 pounds, and freshly distilled turpentine, 280 pounds, were charged to a 100 gallon neutralization tank equipped with an agitator for mixing. This yielded on filtration 641 pounds of filtrate, containing 46% rosin with a resultant resin acid content of 40%. The resin acids were partially neutralized with 91.75 pounds sodium hydroxide solution (28.1% NaOH, 0.645 mole). To this mixture 14 pounds water was added. The batch was agitated until homogeneous. The composition of the mixture is tabulated in Table I.

A 154 pound aliquot of the above was charged to the kettle, heated with a high-boiling, heat-exchange liquid consisting essentially of diphenyl ether at 260° F. circulating in the jacket. After about 40 minutes, distillation started and when the pot temperature reached 215° F. the steam sparger was turned on and another 95 pound aliquot of the mixture was added over a 60 minute period holding the temperature at 215 to 218° F. After 3 hours the distillate contained less than 1% oils. Steam stripping was continued for another three hours to remove volatile oils.

The batch was drawn from the kettle. There was 101.5 pounds which contained 77% solids and 19.4% free resin acids on a solid basis.

Three batches made by the above procedure were combined in the 100 gallon mixing tank, heated to 200° F. and the solids content adjusted to 75% by adding water.

EXAMPLE 2

*Paste size from commercially cleaned pine oleoresin.*—In Example 1, crude pine oleoresin was used as a raw material. In the conventional process for producing commercial gum rosin and turpentine, pine oleoresin is diluted with about ⅓ part of turpentine, filtered and washed with water containing a little oxalic acid. In this experiment 438 pounds commercially cleaned pine oleoresin containing 65% rosin with a resin acid content of 87% 34.2% turpentine and 1.8% water was placed in the neutralization tank and a solution of 24.1 pounds sodium hydroxide dissolved in 47.5 pounds water. The batch was agitated until uniform composition was obtained. The resultant composition is tabulated in Table I.

A 150 pound aliquot of this mixture was charged to the kettle, heated with a high-boiling, heat-exchange liquid consisting essentially of diphenyl ether at 250° F. After 20 minutes the pot temperatures had reached 216° F. Steam sparging was started and 50 more pounds of the mixture was added over a period of 80 minutes holding the temperature at 218–219° F. Most of the turpentine had distilled by heating an additional 30 minutes. After stripping 3 hours, the batch, 152 pounds, was discharged which contained 77% solids and 22.2% free resin acids on a solid basis.

Three batches were combined and adjusted to 75% solids like in Example 1.

In a series of 3 batches with a stripping temperature of 215° F. the average solids content was 76.1% while in another series of 4 batches with a slightly higher temperature, 218° F., the average solids was 79%.

EXAMPLE 3

*Paste size from commercially cleaned, pine oleoresin.*—The size preparation in Example 2 was repeated using a second lot of commercially washed pine oleoresin to test the uniformity in processing and the final product.

EXAMPLE 4

*Fortified paste size from pine oleoresin.*—One hundred and twenty-six pounds of commercially cleaned pine gum (65% rosin, 34% turpentine) was placed in the kettle. The rosin had a resin acid content of 87%. A solution of 3.28 pounds of maleic anhydride and 1.12 pounds of acetone was added and agitated. This was discharged from the kettle and a 110 pound aliquot of the mixture was returned for processing. A solution of 8.125 pounds of sodium hydroxide (.203 mole) in 24 pounds of water was added while agitating. The composition of the batch at this point is given in Table I. The charge was heated with a high-boiling, heat-exchange liquid consisting essentially of diphenyl ether at 260° F., in the kettle jacket. After one hour, the steam was turned on and the turpentine distilled. This required about 3 hours. The batch was stripped as above.

After stripping, tests indicated that the charge contained 67.7% solids. The kettle was heated to distill 12.25 pounds of water. Ninety-eight pounds of paste resulted which contained 76.8% solids and 21.0% free resin acids on a solids basis.

*Table I*

COMPOSITION OF NEUTRALIZED PINE OLEORESINS USED FOR MAKING SIZE

| Example No. | Sodium Resinate | | Resin Acids | | Neutrals [a] | | Turpentine | | Water | |
|---|---|---|---|---|---|---|---|---|---|---|
| | Lbs. | Percent | Lbs. | Percent | Lbs. | Percent | Lbs. | Percent | Lbs. | Percent |
| 1 | 209.6 | 28.00 | 61.5 | 8.24 | 38.5 | 5.16 | 345.8 | 46.6 | 91.9 | 12.0 |
| 2 | 194.7 | 38.25 | 65.5 | 12.85 | 33.3 | 6.5 | 149.8 | 29.4 | 66.2 | 13.0 |
| 4 | [b]52.09 | [b]36.59 | 16.12 | 11.32 | 8.34 | 5.86 | 36.14 | 25.38 | 29.69 | 20.85 |

[a] Non-acidic resinous material.
[b] Sodium salts of resin acids and maleic modified rosin.

EXAMPLE 5

*Dry neutral size.*—Paper size as prepared in Example 2, 500 g. which contained 75% solids and 16.6% resin acids,
83 g. (0.275 mole) was charged to a ball mill, loaded with 3½ pounds, ⅝ inch bearing grade steel balls and 7 black iron rods—four 1x2 in.; two 1x3 in.; one 1½x2 in. To this was added 11.0 g. sodium hydroxide, (.275 mole) in 22 g. water. The mill was rotated and heated in an oil bath maintained at 260° F. A small stream of carbon dioxide (cylinder) flowed through the mill to remove the water as it vaporized. After about 3 hours the water appeared to be removed. The temperature of the bath was raised to 300° F. for about an hour. No water distilled at this temperature.

Toward the end movement of the metal rods and balls had stopped because of packing of the dry size. These were broken loose by tapping the side of the mill. The oil bath was removed and the batch was allowed to cool and grind. Six to eight hours was required for the whole process.

The product was a dry almost colorless, grayish powder with zero acid number containing 4.2% water.

EXAMPLE 6

*Dry acid size.*—Paper size as prepared in Example 2, 500 g. was dried as above except the oil bath was heated to 300° F. without addition of sodium hydroxide.

*Sizing efficiencies.*—The sizes have been evaluated for sizing efficiencies. In the size tests 1% of each size on solids basis and 1½% of alum was added to 0.88 brightness pine kraft pulp and the pH adjusted to 4.5. Handsheets, 2.5 g., were prepared and examined for sizing effect. The results are tabulated in Table II. Part A is a comparison of the fortified size IV with 4 commercial fortified sizes. Part B is a comparison of a composite of 3 batches prepared in accordance with Example 1, 3 batches prepared in accordance with Example 2, and one batch prepared in accordance to Example 3. The dry sizes used in Part C were made in accordance with Examples 5 and 6.

The results of the sizing tests indicate the paper sizes prepared from pine oleoresin are effective and compare favorably with commercial materials under the conditions of the tests.

*Table II*

FOTOSIZE TEST—TAPPI INK PENETRATION TIME

A. Fortified paste sizes:        Ink peneration, seconds
     Commercial size A, 70% solids _____ 46
     Commercial size B, 70% solids _____ 45
     Commercial size C, 70% solids _____ 39
     Commercial size D, 70% solids _____ 47
     Fortified size IV _____ 47
B. Unfortified paste sizes:
     Pine gum size, Example 1 _____ 21
     Pine gum size, Example 2 _____ 29
     Pine gum size, Example 3 _____ 26
     Fortified size, Example 4 _____ 40
C. Dry size:
     Neutralized dry size, Example 5 _____ 64
     Dry acid size, Example 6 _____ 65
     Commercial fortified paste size A above _____ 71

We claim:

1. A process of preparing a dry acid size from pine oleoresin comprising neutralizing about from 75% to 90% by weight of the resin acids in pine oleoresin with caustic, heating the resulting partially-neutralized pine oleoresin at a temperature of about from 215° F. to 219° F., while subjecting it to steam distillation to remove volatiles, until the water content thereof is below 28% by weight, and milling the resulting heated and steam-distilled product in a ball mill provided with an inert atmosphere and at a temperature of about from 260° F. to 300° F. until the moisture content of the milled product is about 4% by weight.

2. A process of preparing a dry neutral size from pine oleoresin comprising neutralizing about from 75% to 90% by weight of the resin acids in pine oleoresin with caustic, heating the resulting partially-neutralized pine oleoresin at a temperature of about from 215° F. to 219° F., while subjecting it to steam distillation to remove volatiles, until the water content thereof is below 28% by weight, mixing the resulting heated and steam-distilled product with sufficient caustic to completely neutralize the residual resin acids therein, and milling the resultant mixture in a ball mill provided with an inert atmosphere and at a temperature of about from 260° F. to 300° F. until the moisture content of the milled product is about 4% by weight.

3. A process of preparing a fortified paste size from maleic modified pine oleoresin comprising neutralizing about from 75% to 90% by weight of the resin acids in maleic modified pine oleoresin with caustic and heating the resulting partially-neutralized pine oleoresin at a temperature of about from 215° F. to 219° F., while subjecting it to steam distillation to remove volatiles, until the water content thereof is below 28% by weight.

References Cited in the file of this patent
UNITED STATES PATENTS
2,846,430   Lawrence et al. ---------- Aug. 5, 1958